J. W. CAUSEY AND A. HARVEY.
ADJUSTABLE GUIDE FOR BAND SAWS.
APPLICATION FILED MAY 25, 1918.
1,311,593.
Patented July 29, 1919.
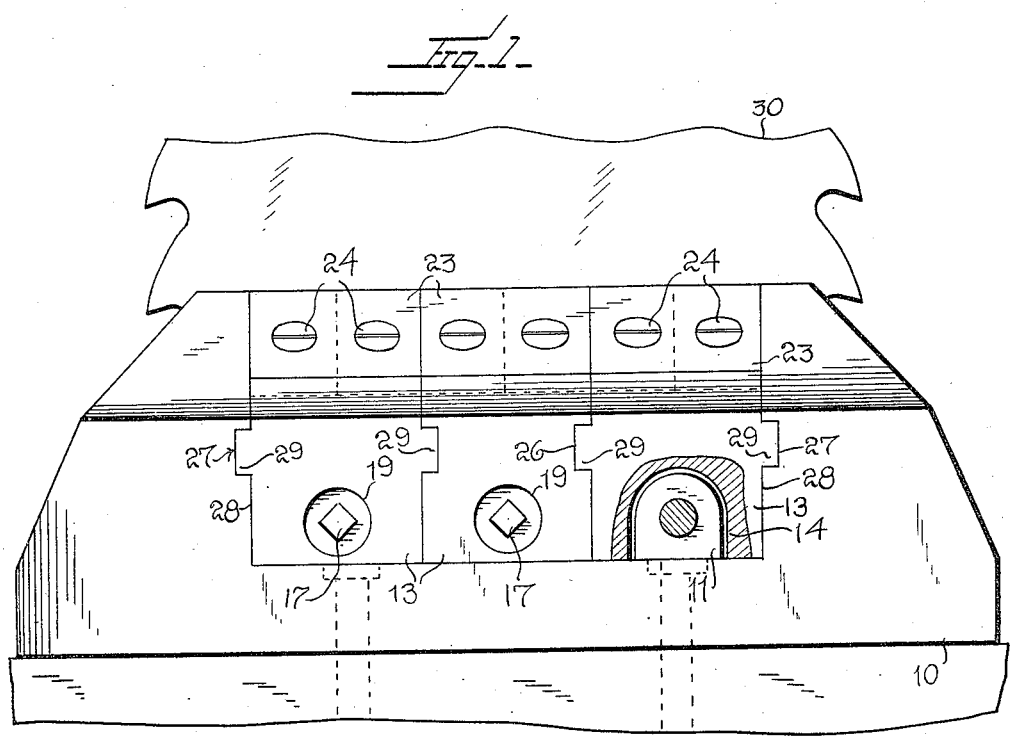
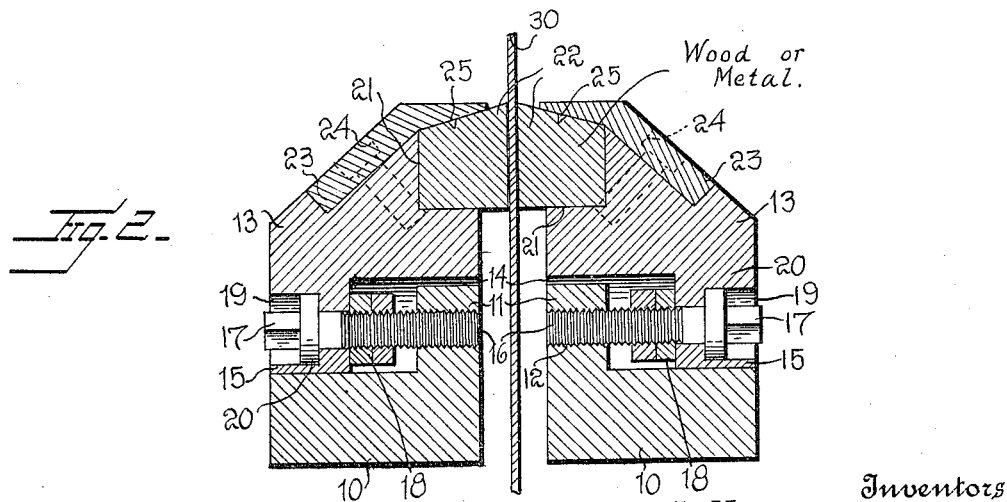
Inventors
A. Harvey
& J. W. Causey
By Watson E. Coleman
Attorney

UNITED STATES PATENT OFFICE.

JOSEPH W. CAUSEY AND AMASA HARVEY, OF CHARLESTON, SOUTH CAROLINA.

ADJUSTABLE GUIDE FOR BAND-SAWS.

1,311,593.  Specification of Letters Patent.  Patented July 29, 1919.

Application filed May 25, 1918. Serial No. 236,630.

*To all whom it may concern:*

Be it known that we, JOSEPH W. CAUSEY and AMASA HARVEY, citizens of the United States, residing at Charleston, in the county of Charleston and State of South Carolina, have invented certain new and useful Improvements in Adjustable Guides for Band-Saws, of which the following is a specification, reference being had to the accompanying drawings.

This invention relates to band saws, and particularly to band saw guides.

The general object of the invention is the provision of a band saw guide so constructed that it will be extremely rigid and durable, and further so constructed that the two elements of the guide may be readily adjusted toward or from each other, and, therefore, toward and from the saw, without the necessity of securing this adjustment by hammering or striking the guides.

A further object is to provide a construction of this character wherein logs getting loose from the carriage or the saw shifting out of line cannot drive the guide blocks back or change their proper position with relation to the saw.

A further object is to provide a band saw guide which is applicable to different forms of band saws designed for double cut, single cut, or re-sawing.

A further object is to provide a band saw guide comprising base members disposed on each side of the saw, supporting blocks mounted upon the base members, there being positive means for shifting the said blocks toward or from each other, the said blocks being provided with removable guide blocks which are disposed on each side of the saw.

Other objects will appear in the course of the following description.

Our invention is illustrated in the accompanying drawings, wherein:—

Figure 1 is a side elevation of the band saw guide partly in section; and

Fig. 2 is a section on the line 2—2 of Fig. 1.

Referring to the drawings, it will be seen that in order to support the guide blocks, which will be later described, we provide the longitudinally extending, vertically recessed base members 10, which are so formed as to fit different makes of mills, these base members having upwardly extending portions 11 formed with a plurality of transversely extending screw-threaded openings 12. Slidably mounted upon the base members 10 are the saw guide supporting blocks 13, illustrated as three in number, though any number may be used, these saw guiding blocks being cut away at their lower corners, as at 14, so as to fit over the upward extensions 11 of the base members, the downwardly extending outer portions 15 of the guide blocks 13 resting upon the upper faces of the members 10.

Passing transversely through the downwardly extended portion of each block 13 is a screw 16, the outer end of which is provided with a head 17, the inner end of the screw having engagement with the threads 12. Nuts 18 are mounted upon the screw and disposed between the upward extension 11 and the downward extension 15, these jam nuts taking up or adjusting the lost motion in the screw 16. The outer face of each block 13 is recessed as at 19 to accommodate a shoulder 20 on the corresponding screw 16 and to accommodate the head 17.

The upper inner corner of each block 13 is cut away as at 21 and supported within this cut-away portion of each guide block are two blocks 22 which may be made of metal or wood and which is of such size that the block projects inward beyond the inner face of the base members 10 and of the block 13. The upper face of each of the guide blocks 22 is upwardly and medially inclined and the upper face of each of the supporting blocks 13 is cut away to receive a metal clamp 23, which is held in place to the block 13 by a plurality of screws 24 and which extends over the upper face of the corresponding guide block and is provided with prongs 25, which may be forced into the block so as to firmly engage it. The clamp 23 is recessed for the reception of the head of the screws 24.

We have illustrated three supporting blocks 13 and the middle one of the three supporting blocks on each side is formed with lateral grooves 26. Grooves 27 are also formed in the end walls 28 of the base members 10. These grooves extend toward the path of travel of the saw in a horizontal plane. The outer blocks 13 are provided with ribs 29 which engage in the grooves 26 and 27. It will be noted that the blocks 13 (which are preferably of iron or steel) have such interlocking engagement with each other and with the supporting base 10 that they form practically a solid body, the different sections of which, however, may be independently adjusted if necessary. Logs getting loose from the carriage cannot drive the blocks 13 back of the base, nor can this occur if the saw dodges out of line. The guide blocks 22 may be made of wood or metal and are intended to be interchangeable, that is, the metal block may be changed for a wood block, or vice versa. Of course these holding blocks or guide blocks 22 are disposed on each side of the saw 30, in a manner usual in constructions of this character.

One of the principal advantages of this invention lies in the fact that the supporting blocks 13 may be positively adjusted toward or from each other by rotating the screws 16 by wrenches engaging the heads of these screws, and inasmuch as these screws 16 do not hold the guide blocks in place upon the bases simply by frictional engagement therewith, it is obvious that a loose log cannot shift the guide blocks out of place unless the power is so great as to strip the threads of the screws 16. In the saw guides known to me it has been necessary, in order to adjust them, that the holding screws be loosened and then the saw guide is hammered or struck to force it inward. The holding screws have to be then tightened and the adjustment tried out and if it is not right, the holding screws must be again loosened and the device again struck until the proper adjustment is secured. With the ordinary saw guides it is a very dangerous task to adjust the guides while the saw is in motion. With our construction, however, it is perfectly safe to make this adjustment as there are no screws to loosen and it is only necessary to apply a wrench to the heads 17. By turning the screws to the right or left, the guide blocks may be shifted outward or inward, thus securing a positive movement of the guide blocks in either direction. It will further be seen that in our construction the blocks 22 are abutted firmly against each other and are in contact over their entire end surfaces so that it is impossible for slivers to become wedged in between the saw and the guide, heating the saw and making it liable to "dun off" and be damaged.

It will further be noted that the upwardly extending ends of the base 10 act as buffers and protect the blocks 13 and the wood or metal blocks 22 and the screws 24 and the clamps 23 from injury as a knot or a limb on the log would strike the end of the base 10 and this inclined end will ward off the blow. There are two of the guide blocks 22 for each of the supporting blocks 13. The object of making them in sections is so that the blocks at the ends may be replaced from time to time by blocks taken from the center, the end blocks wearing much faster than do the middle ones. The object of forming the supporting blocks 13 in sections is that if these supporting blocks were made in one piece they would not properly guide the saw. One edge may be running perfectly and if only one piece were used this could not adjust the other edge without distorting the perfect edge. Sometimes also it is the end sections which must be adjusted and the middle section must remain in its normal position. It will be seen that our saw guide is rigid, positively shifted in each direction and has but few parts and those of a very simple and lasting character. The base A is bolted to the table of the band mill by countersunk bolts passing through its base under the guide hooks, the openings for these bolts being indicated by dotted lines in Fig. 1. Any other suitable means for supporting the base upon the table, however, may be used.

Having described our invention, what we claim is:

1. A guide for band saws comprising oppositely disposed spaced base members, supporting blocks slidably mounted upon the base members for movement toward or from each other, means for adjusting the supporting blocks, guide blocks detachably mounted upon the upper ends of the supporting blocks and extending inward thereof, and clamps mounted upon the upper faces of the supporting blocks and extending over the guide blocks and detachably held to the supporting blocks.

2. A guide for band saws comprising laterally disposed base members, supporting blocks mounted upon the base members for lateral adjustment toward or from each other, means operatively engaging the supporting blocks and base members and adapted to cause the movement of the supporting blocks upon the base members in either direction, the upper ends of the supporting blocks at their inner corners being cut away, guide blocks mounted in the cut-away portions of the supporting blocks, clamping plates mounted upon the supporting blocks and extending over the guide blocks and having prongs extending into the guide blocks, and screws engaging the clamping plates with the supporting blocks.

3. A guide for band saws comprising base members cut away upon their upper faces to provide inwardly disposed upwardly projecting extensions, said extensions having screw-threaded apertures parallel to the upper face of the base member, supporting blocks disposed upon the upper faces of said extensions spaced from the upward extension of the base members and having downward extensions and resting upon the base members, a screw for each supporting block passing through its downward extension and having threaded engagement with the upward extension of the corresponding base member, each screw having thereon a shoulder, and clamp nuts mounted upon said screw between said extensions and holding the extensions of the supporting blocks against the shoulders of the corresponding screws.

4. A saw guide comprising base members having upwardly extending end walls, a plurality of supporting blocks mounted upon said base members between the end walls thereof, the supporting blocks having sliding interlocking engagement with each other and the end blocks having sliding interlocking engagement with the end walls of the base, and means engaging each separate block and the corresponding base member for permitting the positive adjustment of the supporting blocks toward or from the saw.

In testimony whereof we hereunto affix our signatures in the presence of two witnesses.

JOSEPH W. CAUSEY.
AMASA HARVEY.

Witnesses:
H. P. KING,
M. L. BRUNSON.

Copies of this patent may be obtained for five cents each, by addressing the "Commissioner of Patents, Washington, D. C."